United States Patent [19]

Shank

[11] 4,196,223

[45] Apr. 1, 1980

[54] METHOD OF PREPARING SAUSAGE CASINGS FROM PIG SKINS

[75] Inventor: Joseph L. Shank, Matteson, Ill.

[73] Assignee: Wilson Foods Corporation, Oklahoma City, Okla.

[21] Appl. No.: 871,430

[22] Filed: Jan. 23, 1978

[51] Int. Cl.$^2$ .......................... A22C 13/00; A23L 1/31
[52] U.S. Cl. ..................................... 426/268; 8/94.18; 8/94.21; 8/94.33; 264/202; 426/277; 426/278; 426/513; 426/519; 426/646
[58] Field of Search .............. 426/105, 140, 262, 264, 426/265, 268, 277, 278, 332, 646, 513, 518, 519; 8/94.18, 94.19 R, 94.21, 94.22, 94.33; 138/118.1; 264/178 R, 183, 202; 260/123.7

[56] References Cited

U.S. PATENT DOCUMENTS

| | | | |
|---|---|---|---|
| 3,073,902 | 1/1963 | Keil et al. | 426/278 X |
| 3,123,481 | 3/1964 | Seiler | 426/140 X |
| 3,151,990 | 10/1964 | McKnight | 426/140 X |
| 3,408,916 | 11/1968 | Cohly et al. | 426/140 X |
| 3,408,917 | 11/1968 | Cohly | 426/140 X |
| 3,408,918 | 11/1968 | Talty et al. | 426/277 |
| 3,494,773 | 2/1970 | Courts et al. | 426/140 X |
| 3,782,977 | 1/1974 | Henderson et al. | 426/140 |
| 3,821,439 | 6/1974 | Cohly et al. | 426/277 |
| 3,833,746 | 9/1974 | Cohly | 426/277 |
| 3,930,036 | 12/1975 | Burke | 426/277 X |

*Primary Examiner*—Arthur L. Corbin
*Attorney, Agent, or Firm*—Dressler, Goldsmith, Clement, Gordon & Shore, Ltd.

[57] ABSTRACT

After curing pig skins with hydrochloric acid, they are ground and then homogenized to a gel. The gel is extruded into a coagulating and tanning bath containing glutaraldehyde in a saturated sodium chloride solution to obtain a coagulated and tanned casing which is thereafter passed into a plasticizing bath containing glycerol and an oxidizing agent.

5 Claims, No Drawings

METHOD OF PREPARING SAUSAGE CASINGS FROM PIG SKINS

BACKGROUND OF THE INVENTION

The present invention relates to an improved artificial sausage casing, and more particularly relates to an improved artificial sausage casing and the method of manufacturing the improved casing.

Traditionally, artificial sausage-type casings have been prepared from animal collagen. Specifically, casings made from animal collagen have been prepared by processing animal hides to break the collagen into a fibrous structure and extruding the collagen fibers in the form of a doughy mass to produce tubular casings. Generally speaking, the first step in all commercial processes is to extrude a very dilute collagenous gel into a coagulating bath, usually saturated sodium or ammonium sulfate because of their excellent solublity and coagulating efficiency to harden the tubular casing for further processing. While the sodium or ammonium sulfate coagulates the collagen film, the salt coagulated film will revert to a thin slurry upon contact with water and thus it is necessary to harden or tan the extruded collagen film to permit further processing of the film and to provide the film with sufficient strength for use as a sausage-type casing. Accordingly, the coagulated film must be subjected to a tanning agent which is completely non-toxic in the form in which it is present in the finished casing, and must produce a casing of sufficient strength to be stuffed with, for example, sausage-type meat, linked, packed and finally cooked.

Commercial processes generally utilize a separate tanning bath, since the high salt concentration of the coagulating bath interferes with tanning. Therefore, the salt concentration must be reduced by one or several attenuated ammonium sulfate baths. The casing then enters the tanning bath which typically consists of various alum salts or aldehydes.

Glutaraldehyde is one of the most effective tanning agents. However, its use presents several problems which has limited its use heretofore. One problem is that the glutaraldehyde is inactivated by residual ammonium sulfate carried by the casing, as well as protein which results in an udesirable yellow or brown discoloration of the casing. Some of the solutions which have been considered to overcome the above problem is to employ other coagulating baths such as aldehydes, ketones, and other salts such as sodium chloride. However, these materials produce casings that are too weak to process. For example, glutaraldehyde alone or saturated sodium chloride alone are ineffective alone and result in a watery extruded tube.

Thus, conventional processes require separate coagulating or hardening, followed by a separate tanning step. See for example U.S. Pat. Nos. 3,151,990; 3,123,481; 3,408,916; 3,408,917 and 3,930,036.

The use of a single bath to both coagulate and tan the casing would be highly desirable. There have been attempts to provide a one step process using either a collagen-alginate slurry (see Courts et al. U.S. Pat. No. 3,494,773 or a collagen-sodium salt slurry (see Cohley et al. U.S. Pat. No. 3,821,439). Neither method has proved to be satisfactory and Cohley et al. suggests a separate tanning step for supplemental hardening.

The present invention provides an improved one step process.

SUMMARY OF THE INVENTION

In the practice of this invention, pig skins, swollen with dilute hydrochloric acid for about six hours are ground and homogenized to a gel by methods well known in the art. The gel, containing about 3% solids, is extruded into a single bath which simultaneously coagulates and tans the casing. After water washing, the casing enters a final bath which simultaneously plasticizes and decolorizes.

DETAILED DESCRIPTION OF PREFERRED EMBODIMENTS

The single bath of this invention comprises from about 0.5 to about 5.0 weight percent of glutaraldehyde in a saturated sodium chloride solution which simultaneously coagulates and tans the casing and gives it a stronger wet strength than either component alone.

In the practice of the process of this invention, the collagen gel, prepared from pig skins swollen with dilute hydrochloric acid for about six hours by methods well known in the art, is extruded into a coagulation-tanning bath comprising from about 0.5 to about 5.0 weight percent of glutaraldehyde in a saturated sodium chloride solution for about four to about 10 minutes. The casing is washed with fresh, running water to remove the salt and any free aldehyde and is then passed into a plasticizing bath consisting of about 5% glycerol at pH 7.0 for about 30 seconds to 1 minute.

Oxidizing agents such as hydrogen peroxide, or oxygen release salts such as ammonium persulfate can be incorporated into the plasticizing bath at levels of from about 0.5 to about 3.0 weight percent to eliminate any color due to the glutaraldehyde browning reaction.

EXAMPLE

A collagen gel is prepared from pigskins previously soaked six hours in 20° Bé HCl, pH 1.5-2.0 at 68°-70° F. The skins are water washed and dried and neutralized in alkaline water. The skins are then ground and diluted with 40° F. water to form a paste at about 25% -35% solids. Finally, the paste is again diluted with cold water and ground in a colloid mill to give a 3% solids gel, taking care to keep the temperature below 38° C. After filtration and deaeration, the gel is continuously extruded into a room temperature coagulating-tanning bath comprising a saturated aqueous sodium chloride solution containing 2.0 weight percent of glutaraldehyde. Coagulation and tanning take place in the bath during a dwell time of about six minutes to produce a strong collagen tube, or casing. The casing is then washed with fresh running water for about 15 minutes and then passed into a plasticizing bath containing 5% glycerol and 3% $H_2O_2$ (w/w) in water for about 15-30 seconds.

Excess water is then removed from the casing; and the casing is passed through a drying chamber between rollers while being maintained in an inflated condition with a captive air bubble.

It is to be understood that the foregoing example is intended to be merely illustrative and that modifications and variations will be apparent to those skilled in the art.

I claim:

1. A method of forming sausage casings from pig skins comprising the steps of:
    (a) curing pig skins with dilute hydrochloric acid;
    (b) grinding said cured skins;

(c) homogenizing said ground skins to a gel;
(d) extruding said gel into a coagulating and tanning bath comprising from about 0.5 to about 5.0 weight percent of glutaraldehyde in a saturated sodium chloride solution to obtain a coagulated and tanned casing; and then
(e) passing said casing into a plasticizing bath containing about 5% glycerol and about 0.5 to 3% of an oxidizing agent.

2. The method of claim 1 wherein said extruded gel is treated in said coagulating and tanning bath for a period of from about 4 to about 10 minutes.

3. The method of claim 2, additionally comprising the step of washing the coagulated, tanned casing with water prior to passing said casing into the plasticizing bath.

4. The method of claim 3 wherein said casing is treated in the plasticizing bath for about thirty seconds to about one minute.

5. The method of claim 1 wherein said oxidizing agent is hydrogen peroxide.

* * * * *